United States Patent [19]
Heninger

[11] Patent Number: 5,656,994
[45] Date of Patent: Aug. 12, 1997

[54] INCENTIVE APPARATUS AND METHOD FOR USE WITH A SEAT BELT

[76] Inventor: Brent D. Heninger, 9161 S. Chickadee Cir., Sandy, Utah 84093

[21] Appl. No.: 590,350

[22] Filed: Jan. 23, 1996

[51] Int. Cl.⁶ .................................................. B60Q 1/00
[52] U.S. Cl. ................. 340/457.1; 340/457; 340/460; 280/801.1; 446/28
[58] Field of Search ........................ 340/457.1, 457, 340/460; 280/801.1; 180/270, 273; 297/468, 482; 446/28

[56] References Cited

U.S. PATENT DOCUMENTS

| | | | |
|---|---|---|---|
| 4,673,195 | 6/1987 | Boyd et al. | 280/801.1 |
| 4,715,839 | 12/1987 | Ford et al. | 446/28 |
| 4,758,020 | 7/1988 | Boyd | 280/801.1 |
| 4,973,106 | 11/1990 | Strovinskas | 297/482 |

*Primary Examiner*—Jeffery Hofsass
*Assistant Examiner*—Sihong Huang
*Attorney, Agent, or Firm*—J. Winslow Young

[57] ABSTRACT

A behavior modification apparatus and method for use in combination with the restraint system in an automobile to encourage a person to use the restraint system wherever the person is riding in the automobile. The apparatus includes a housing and an attachment means for releasably attaching the housing to the restraint system. The housing contains an electronic circuit and a pressure sensitive switch. The switch senses when the restraint system has been properly engaged about the person and activates the electronic circuitry. An incentive device includes a battery and is releasably mounted to the housing in electrical contact with the electronic circuitry so that closure of the switch causes the incentive device to be electrically operated by the battery.

7 Claims, 3 Drawing Sheets

INCENTIVE APPARATUS AND METHOD FOR USE WITH A SEAT BELT

BACKGROUND

1. Field of the Invention

This invention relates to restraint systems for automobiles and, more particularly, to a novel encourager apparatus and method for use in conjunction with a seat belt-type restraint system thereby encouraging an occupant in an automobile to regularly use the seat belt, the encourager apparatus providing activation means for activating a toy or other electronic device when the seat belt is properly engaged about the occupant.

2. The Prior Art

Automobile accidents are considered to be one of the leading causes of death or injury to children in the United States. Even though passive restraint systems such as lap/shoulder belts along with special car seat restraint devices have been shown statistically to reduce significantly the frequency and even the severity of injuries, especially to children, during automobile accidents, many parents or other caregivers either consciously or unconsciously neglect to affix the appropriate restraint system to the child. Often the rationale for failure to use the restraint system is that it is too much bother, further, that the child objects strenuously to being confined by the restraint system. Accordingly, many parents simply forego the use of the restraint system in order to avoid any unpleasantness. Some persons even adopt the rationale that they are careful drivers or are only travelling a short distance so that use of a seat belt is unwarranted. However, statistics have shown that many automobile accidents occur within 25 miles or so of home and generally are the result of unforeseen events over which even the most careful driver has absolutely no control.

In view of the foregoing it would be an advancement in the art to provide a system for encouraging usage of a seat belt, especially for children. It would also be an advancement in the art to provide an encouragement device for reinforcing proper seat belt usage not only by children but also by adults. Such a novel apparatus and method is disclosed and claimed herein.

BRIEF SUMMARY AND OBJECTS OF THE INVENTION

The present invention includes an apparatus and method for encouraging the use of a seat belt especially by children but can also be adapted for use by an adult. The invention includes an adapter having a pressure switch, the adapter being configured to being releasably attached to a seat belt with the pressure switch being oriented toward the passenger to sense when the seat belt is securely fastened about the passenger. The adapter is designed to releasably support any preselected behavioral modification device such as a toy, message system, or the like. Proper securement to a seat belt coupled with activation of the pressure switch causes the behavioral modification device to become electronically activated whereby it can, for example, transmit a predetermined reinforcement signal to the passenger such as a recorded statement, musical sounds, light displays, or the like.

It is, therefore, a primary object of this invention to provide improvements in apparatus for encouraging usage of seat belts.

Another object of this invention is to provide improvements in the method of encouraging seat belt usage.

Another object of this invention is to provide a behavioral modification device which can be demountably affixed to a seat belt.

Another object of this invention is to provide a behavioral modification device which is activated upon securement of the seat belt.

Another object of this invention is to provide a behavioral modification system wherein the behavior modification device is interchangeable to retain interest for the person undergoing behavior modification.

These and other objects and features of the present invention will become more readily apparent from the following description with its accompanying drawing and the appended claims.

DETAILED DESCRIPTION OF THE PREFERRED EMBODIMENT

The invention is best understood from the following description with reference to the accompanying drawing wherein like parts are designated with like numerals throughout and taken in conjunction with the appended claims.

General Discussion

Habit, properly directed, is probably the single most important aspect of behavior when it comes to such factors as seat belt usage. For example, airplane pilots have been reported as having reached for their seat belts when sitting down at the dinner table all as a result of a well-developed habit of seat belt usage. A pilot would never even consider starting engines without having the seat belt snugly in place. This is simply the result of habit which is why it is so important to set the proper habit patterns in children. The ultimate goal of my invention is to make seat belt usage automatic so that each child will eventually insist upon using a seat belt when riding in any automobile.

It is for this purpose that I have invented my unique encourager apparatus and method. Specifically, I wanted to have children and even adults not only accept regular, automatic seat belt usage but to also look forward to the same by reason of the incentive system that my invention supplies. My novel encourager includes a basic attachment element and a replaceable incentive element that is removably mounted to the attachment element. The attachment element is configured to releasably engage a seat belt. A switch system is operable to sense when the seat belt is both securely engaged as well as tightened adequately about the passenger. The incentive element includes an electronic circuitry that is activated by the switch system to thereby supplement the behavioral modification aspects of the incentive element. For example, the incentive element could include a musical device, tape player, a video game, or the like.

Detailed Description

Figure 1:
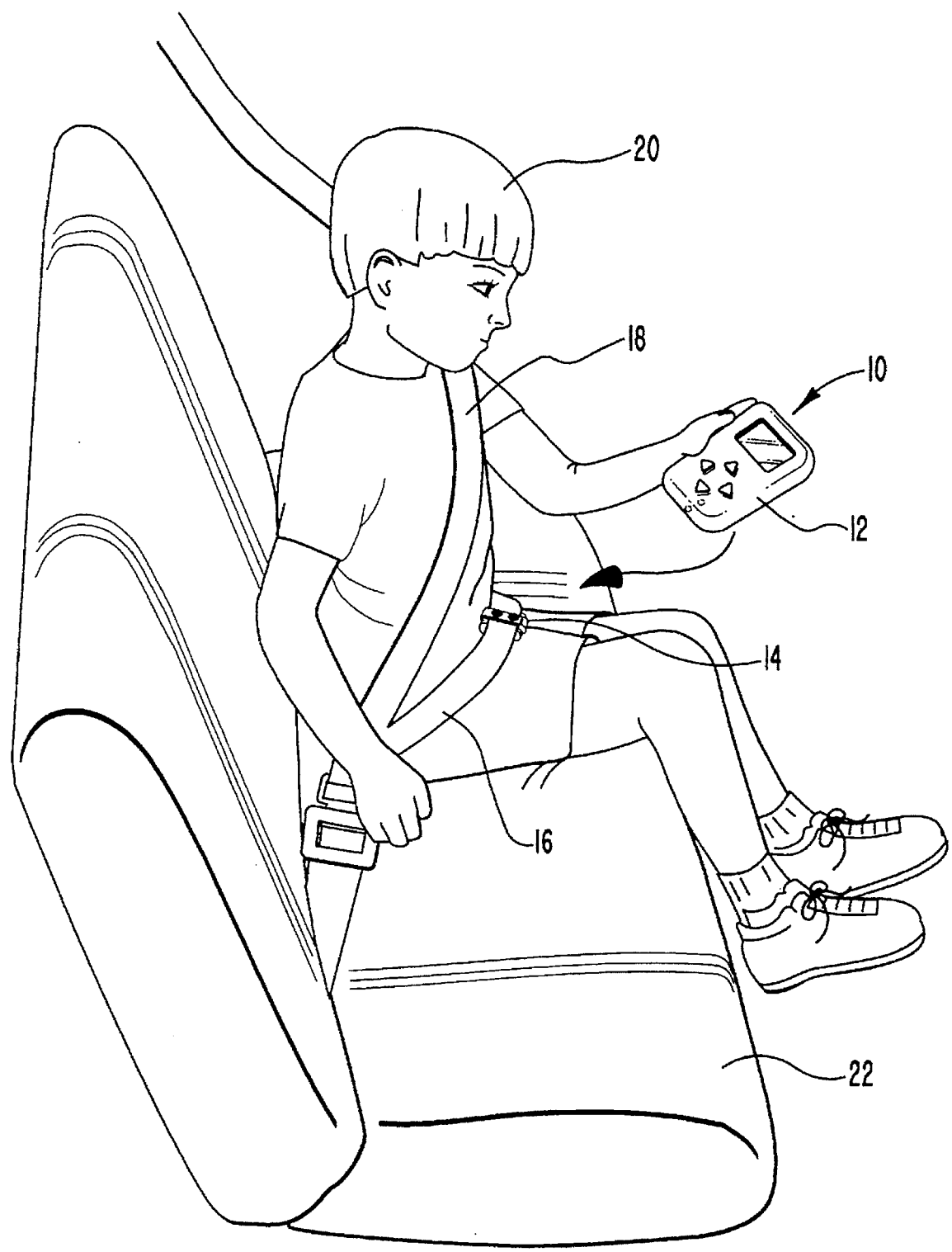
FIG. 1 is a perspective view of one presently preferred embodiment of the encouragement device of this invention shown in the environment of passive restraint system engaged about a passenger.

Referring now to FIG. 1, the novel encourager apparatus of this invention is shown generally at 10 and includes an amusement device 12 attachable to a belt clip 14. Belt clip 14 is configured to be releasably mounted to a conventional seat belt 16. Seat belt 16 is combined with a shoulder belt 18 to provide the necessary restraint system for a passenger 20 riding on a seat 22 of an automobile (not shown). Amusement device 12 in this presently preferred embodiment of encourager apparatus 10 is shown as a hand-portable electronic game device. Amusement device 12, as an electronic device, is specifically configured to be operable only upon attachment to belt clip 14 and only if belt clip 14 is secured to seat belt 16 and, further, only if seat belt 16 is snugly engaged about passenger 20. In this manner, passenger 20 can only achieve the entertainment benefit of amusement device 12 if, first, seat belt 16 is snugly engaged across the lap of passenger 20 and, second, if belt clip 14 is secured to seat belt 16 to thereby complete the necessary electrical circuitry for amusement device 12. Clearly, of course, amusement device 12 need not be an electrically driven device but can be any other amusement device such as a stuffed toy, toy, or the like (not shown) which can be either removably mounted to belt clip 14 or permanently secured thereto. However, I feel that an electronic device such as amusement device 12 which must be secured to belt clip 14 and which must have belt clip 14 secured to a properly fastened seat belt 16 in order for amusement device 12 to be operable is the most advantageous system for encouraging passenger 20 to use seat belt 16.

Figure 2:
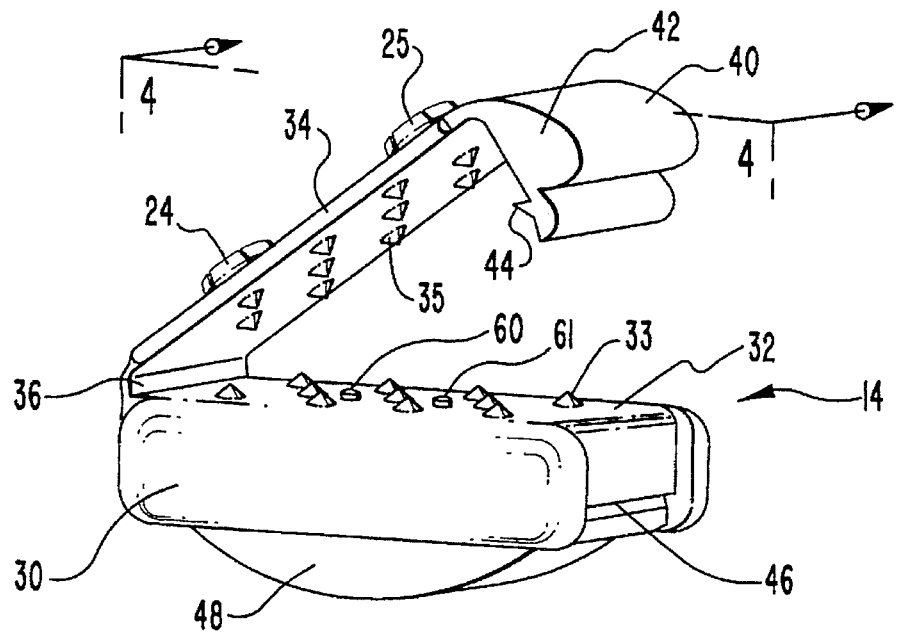
FIG. 2 is a perspective view of the adapter portion of the encouragement device shown opened to receive the seat belt.
Figure 3:
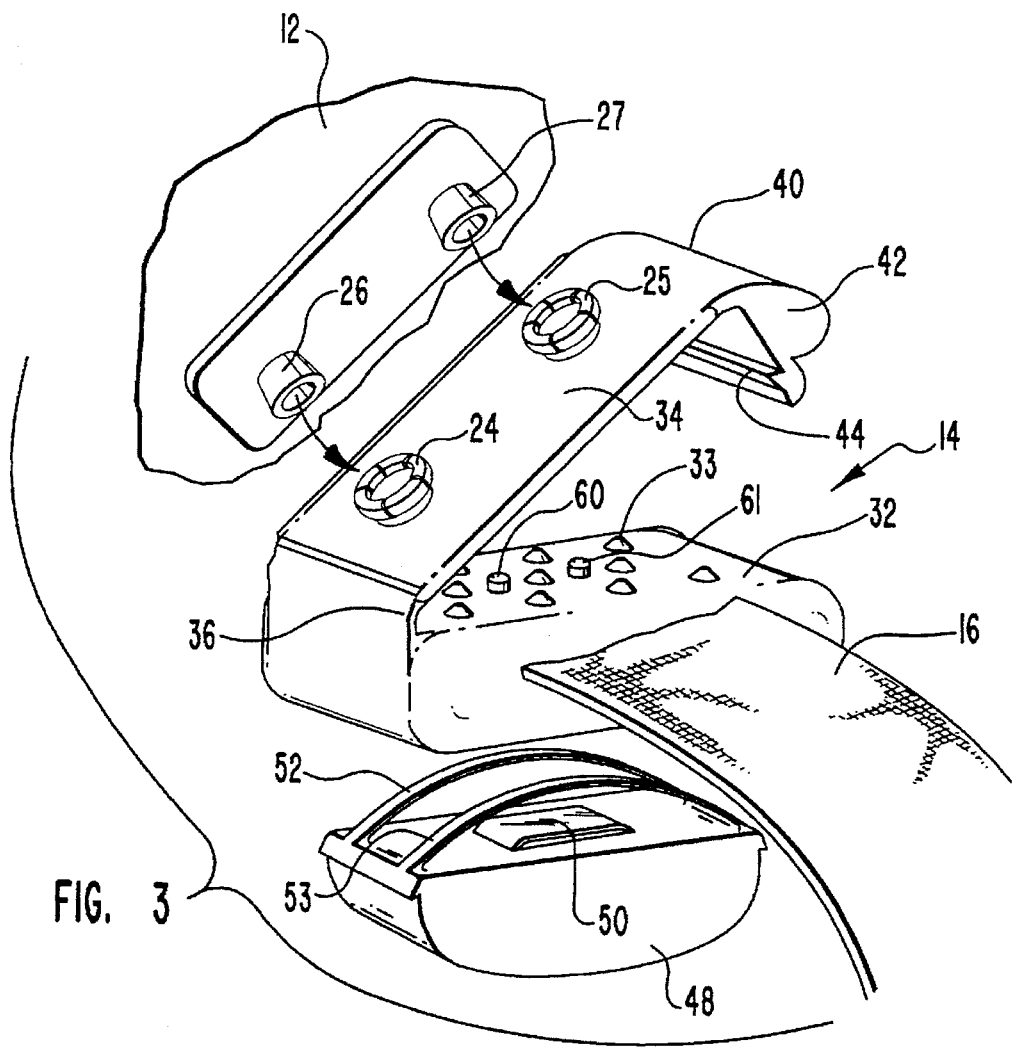
FIG. 3 is an exploded, perspective view of the encouragement device shown in the environment of fragmentary portions of a seat belt and an amusement device to illustrate the interrelationship of the various components.

Referring now to FIGS. 2 and 3, belt clip 14 is shown prior to attachment to seat belt 16 (FIG. 1). In particular, belt clip 14 includes a body 30 having a lower jaw 32 on its upper face. An upper jaw 34 is hingedly joined to body 30 at a hinge 36 and cooperates with lower jaw 32 to engage seat belt 16 therebetween. Upper jaw 34 includes a latch 40 having a lip 42 extending downwardly from the end of upper jaw 34 with a sear 44 extending outwardly from the inner face of lip 42. Sear 44 is releasably engagable in a detent 46 on the end of housing 30 to allow the user, passenger 20, for example, to releasably engage upper jaw 34 to lower jaw 32. The inner face of lower jaw 32 includes a plurality of teeth 33 while the inner face of upper jaw 34 includes a plurality of teeth 35. Importantly, the space between lower jaw 32 and upper jaw 34 is designed to receive therein seat belt 16 (FIGS. 1 and 3) with teeth 33 and teeth 35 engaging the respective surfaces of seat belt 16 engaged between lower jaw 32 and upper jaw 34.

Upper jaw 34 has spring clips 24 and 25 mounted on the outer surface thereof. Spring clips 24 and 25 are configured to releasably receive a corresponding pair of clip inserts 26 and 27 on the base of amusement device 12. Clip inserts 26 and 27 provide electrical contact from spring clips 24 and 25 to complete the electrical circuit between clip inserts 26 and 27.

Body 30 of belt clip 14 is preferentially fabricated from a resilient material such as a rubber or plastic so as to accommodate upper jaw 34 being hingedly joined to body 30 at a hinge 36. Further, the resiliency of upper jaw 34 provides the necessary engagement force to hold sear 44 in detent 46 which force is readily overcome by the passenger selectively pulling outwardly on lip 42 to disengage sear 44 from detent 46 thus causing latch 40 to be opened. Closure of latch 40 is readily accomplished by simply pushing lip 42 downwardly until sear 42 is received in detent 46. The resiliency of upper jaw 34 is adequate to allow sear 44 to pass downwardly into engagement with detent 46 during this closure motion.

Figure 4:
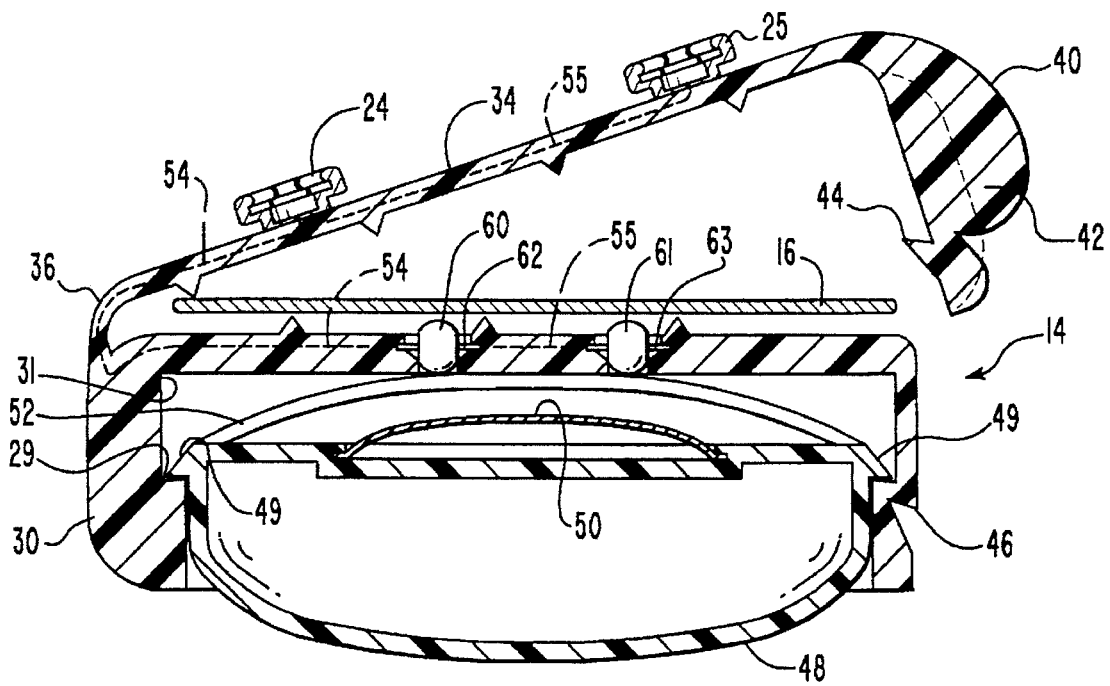
FIG. 4 is a cross-sectional view of the adaptor shown opened to receive therein the seat belt.
Figure 5:
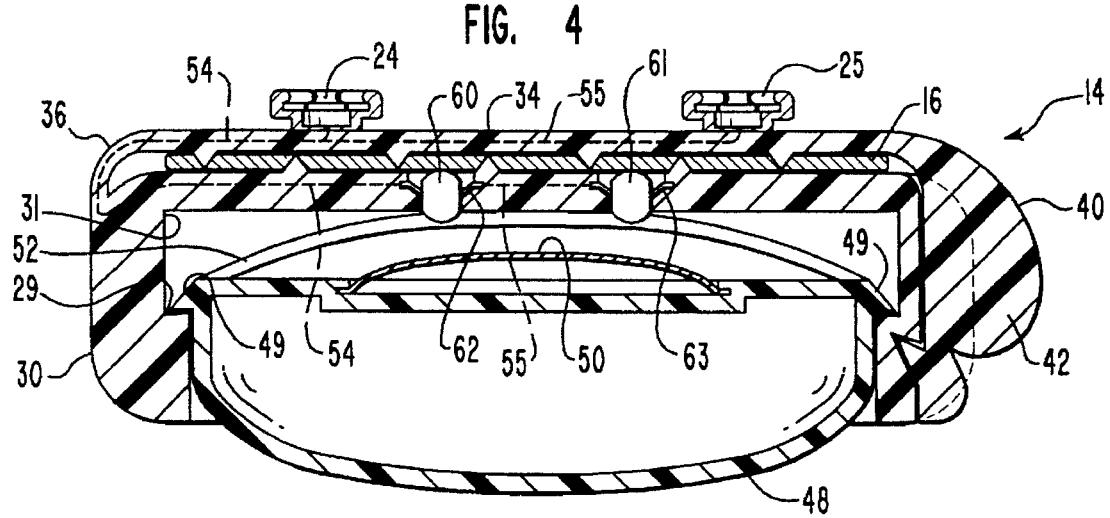
FIG. 5 is the cross-sectional view of FIG. 4 showing the adapter closed upon the seat belt.
Figure 6:
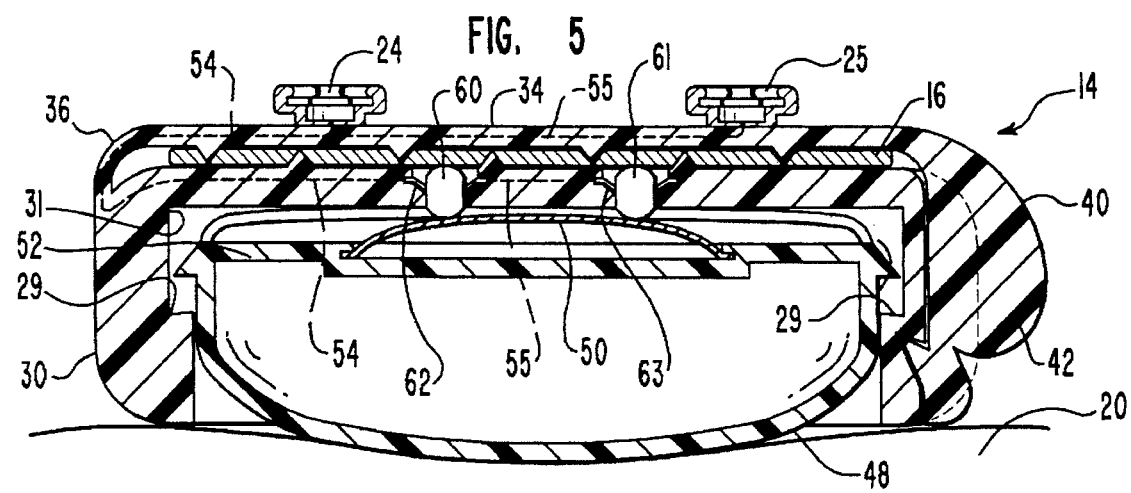
FIG. 6 is the cross-sectional view of FIG. 5 showing the adapter pressed against the lap of a passenger to close the switch therein.

Referring now also to FIGS. 4–6, a pair of contacts 60 and 61 extend upwardly through the face of lower jaw 32 and are resiliently mounted in body 30 by a pair of springs 62 and 63, respectively. Engagement of seat belt 16 between upper jaw 34 and lower jaw 32 causes seat belt 16 to depress contacts 60 and 61 downwardly against the resiliency of springs 62 and 63, respectively, until contacts 60 and 61 are exposed for possible electrical contact with contact plate 50 as will be discussed more fully hereinafter.

Body 30 includes a cavity 31 into which pressure pad 48 is telescopically received. Internally, cavity 31 includes a shelf 29 which circumscribes the interior of cavity 31 and serves as a retainer for releasably holding pressure pad 48 inside cavity An outwardly oriented flange 49 circumscribes pressure pad 48 and rests against shelf 29. A pair of leaf springs 52 and 53 are mounted to the top surface of pressure pad 48 and resiliently engage the bottom surface of lower jaw 32 to resiliently urge flange 49 downwardly against shelf 29. Contact plate 50 is mounted to the top surface of pressure pad 48 at a position between leaf springs 52 and 53 where it is exposed to being raised into contact with contacts 60, and 61.

Body 30 is configured as a hollow body having a cavity 31 therein with an opening in its bottom surface. A pressure pad 48 resiliently mounted in cavity 31 and extends downwardly from body 30. Referring now also to FIG. 3, pressure pad 48 is shown demounted from body 30 to illustrate the location of contact plate 50 and a pair of spring members 52 and 53 which resiliently urge pressure pad 48 downwardly with respect to body 30. The function of contact plate 50 and its interrelationship With spring members 52 and 53 will be discussed more fully hereinafter.

Referring now more specifically to FIGS. 4–6, belt clip 14 is shown in three of its operative positions of open to receive seat belt 16 (FIG. 3); closed about seat belt 16 thereby pressing contacts 60 and 61 downwardly (FIG. 5); and the upward movement of pressure pad 48 to bring contact plate 50 into electrical contact with contacts 60 and 61 (FIG. 6) as they are pressed downwardly. Accordingly, in order for the electrical circuit of amusement device 12 to be completed it is necessary for (1) seat belt 16 to be securely engaged between lower jaw 32 and upper jaw 34 as shown in FIG. 5 to thereby press contacts 60 and 61 downwardly; and (2) seat belt 16 to be drawn sufficiently snugly across the lap of passenger 20 to cause pressure pad 48 to be forced upwardly into body 30 to bring contact plate 50 into electrical contact with contacts 60 and 61 as shown in FIG. 6.

With specific reference to FIG. 6, belt clip 14 is shown cinched downwardly against the lap of passenger 20 by seat belt 16 having been suitably secured across the lap of passenger 20. Downward movement of belt clip 14 forces pressure pad 48 upwardly into cavity 31 to bring contact plate 50 into electrical contact across contacts 60 and 61. Contact plate 50 thereby completes the electrical circuit between contacts 60 and 61 to thus provide electrical energy to amusement device 12.

The Method

The method of this invention is designed to create within passenger 20 an almost reflexive action for securing seat belt 16 any time passenger 20 sits on seat 22. Further, the method of this invention encourages passenger 20 to secure seat belt 16 in a snug fitting relationship whenever seat belt 16 is thus secured. To accomplish these highly desirable goals, belt clip 14 is provided as an attachment and activation mechanism for amusement device 12. Attachment of belt clip 14 is achieved through lower jaw 32 engagedly receiving seat belt 16 in a snug fitting relationship in cooperation with upper jaw 34. Sear 44 releasably engages detent 46 to hold upper jaw 34 downwardly against lower jaw 32 thereby securing seat belt 16 between upper jaw 34 and lower jaw 32. Teeth 35 and teeth 33 assist upper jaw 34 and lower jaw 32, respectively, in holding belt clip 14 to seat belt 16.

The clamping of seat belt 16 between lower jaw 32 and upper jaw 34 causes seat belt 16 to depress contacts 60 and 61 downwardly into cavity 31. The further tightening of seat belt 16 about passenger 20 forces belt clip 14 against the lap of passenger 20 thereby depressing pressure pad 48 upwardly into cavity 31. The upward movement of pressure pad 48 depresses springs 52 and 53 and raises contact plate 50 into electrical contact with contacts 60 and 61. Contact plate 50 thereby completes the electrical circuit between contacts 60 and 61. Electrical lead 54 provides the electrical connection between contact 60 and spring clip 24 while electrical lead 55 provides the electrical connection between contact 61 and spring clip 25. In this manner, securement of seat belt 16 between lower jaw 32 and upper jaw 34 along with the snug application of seat belt 16 across the lap of passenger 20 to push pressure pad 48 upwardly to close the electrical connection across contacts 60 and 61 closes the electrical circuit necessary for the operation of amusement device 12. Accordingly, passenger 20 receives a positive reinforcement each time seat belt 16 is properly secured thereby providing an incentive for the regular and proper use of seat belt 16.

Advantageously, amusement device 12, if an electronic system, is inoperable until the foregoing securement sequence for seat belt 16 has been completed and, furthermore, while the integrity of the same is maintained. If at any time seat belt 16 is (1) not sufficiently engaged between lower jaw 32 and upper jaw 34 to adequately depress contacts 60 and 61 and (2) if pressure pad 48 is allowed to be flexed outwardly from cavity 31 so as to remove contact plate 50 away from contacts 60 and 61 then the electrical circuit for amusement device 12 will be interrupted. Interruption of the electrical circuit to amusement device 12 will cause amusement device 12 to cease to function thereby alerting passenger 20 or the appropriate caregiver (not shown) of the need to correct the particular deficiency whether the deficiency is caused by a disengagement of seat belt 16 from between lower jaw 32 and upper jaw 34 and/or the loss of sufficient tension on seat belt 16 which would allow pressure pad 48 to extend outwardly from cavity 31. This latter event is the most probable condition to be encountered and is an important teaching moment since it continually reminds passenger 20 of the need to have seat belt 16 snugly engaged across his/her lap.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An encourager for encouraging a person to use a restraint system in an automobile comprising:
    a basal element;
    an electronic circuitry in said basal element;
    clip means on said basal element for releasably clipping said basal element to the restraint system of an automobile;
    an amusement device mounted to said basal element, said amusement device comprising an electrically operated motivational means for providing an incentive to the person for using the restraint system; and
    pressure switch means in said basal element, said pressure switch means operating said electronic circuitry upon being pressed against the person when the restraint system is properly secured about the person.

2. The encourager defined in claim 1 wherein said amusement device includes engagement means for releasably mounting said amusement device to said basal element.

3. The encourager defined in claim 2 wherein said amusement device comprises interchange means for interchanging a plurality of amusement devices with each of said plurality of interchangeable amusement devices being selectively configured to provide a predetermined amusement response for the person.

4. An incentive system for use in combination with a restraint system in an automobile to encourage use of the restraint system by a person in the automobile comprising:
    a housing;
    clip means on said housing for releasably clipping said housing to the restraint system;
    an incentive device;
    mounting means on said housing for releasably mounting said incentive device to said housing;
    an electronic circuitry in said housing;
    contact means in said mounting means for electrically connecting said incentive device to said electronic circuitry; and
    a pressure switch on said clip means, said pressure switch being closed when the restraint system is properly engaged about the person to thereby cause the presence of the person engaged by the restraint system to press against said pressure switch, said pressure switch electrically activating said electronic circuitry, said incentive device being electrically activated by said electronic circuitry to create an incentive for the person to use the restraint system.

5. The incentive system defined in claim 4 wherein said incentive device comprises an amusement device selected from a plurality of amusement devices.

6. The incentive system defined in claim 4 wherein said incentive device includes a prerecorded audio message with said prerecorded audio message being transmitted to the person when the restraint system has been properly affixed about the person.

7. A method for motivating a person to use the restraint system in an automobile comprising the steps of:
    selecting an incentive device with an electronic system therein, said electronic system being operable to provide motivation to the person;
    providing a pressure switch means for electronically activating said electronic system when the restraint system is used by the person;

releasably mounting said incentive device to the restraint system of the automobile; and closing said pressure switch means by pressing said pressure switch means against the person thereby motivating the person with said incentive device when the person is using the restraint system.

* * * * *